United States Patent [19]

Wang

[11] 4,426,244

[45] Jan. 17, 1984

[54] COOLING DEVICE FOR ULTRASONIC HORNS

[75] Inventor: Kenneth Y. Wang, Greensboro, N.C.

[73] Assignee: Burlington Industries, Inc., Greensboro, N.C.

[21] Appl. No.: 413,445

[22] Filed: Aug. 31, 1982

[51] Int. Cl.³ .............................................. B29C 27/08
[52] U.S. Cl. .................................... 156/498; 156/73.1;
156/580.1; 228/1 B; 228/1 R; 228/110; 264/23
[58] Field of Search ..................... 156/73.1, 498, 580.1,
156/580.2; 228/1 B, 1 R, 110; 264/23

[56] References Cited

U.S. PATENT DOCUMENTS

| | | | |
|---|---|---|---|
| 2,587,211 | 2/1952 | Piazze | 156/498 X |
| 3,022,814 | 2/1962 | Bodine | 156/498 X |
| 3,405,024 | 10/1968 | Attwood et al. | 156/580.1 X |
| 3,464,102 | 9/1969 | Soloff | 156/580.2 |
| 3,529,660 | 9/1970 | Obeda | 228/1 R X |
| 4,088,519 | 5/1978 | Johnson | 228/1 R X |
| 4,359,361 | 11/1982 | Wright | 156/498 X |

*Primary Examiner*—Robert A. Dawson
*Attorney, Agent, or Firm*—Cushman, Darby & Cushman

[57] ABSTRACT

A device for improved cooling of ultrasonic horns preferably includes a pair of manifold units which direct a stream of cooling fluid (e.g. air) so as to impinge upon both sides of ultrasonic bonding horns disposed substantially across the width of a moveable web of textile material, the stream impinging at or above the nodal area of the horns.

15 Claims, 3 Drawing Figures

U.S. Patent   Jan. 17, 1984   4,426,244
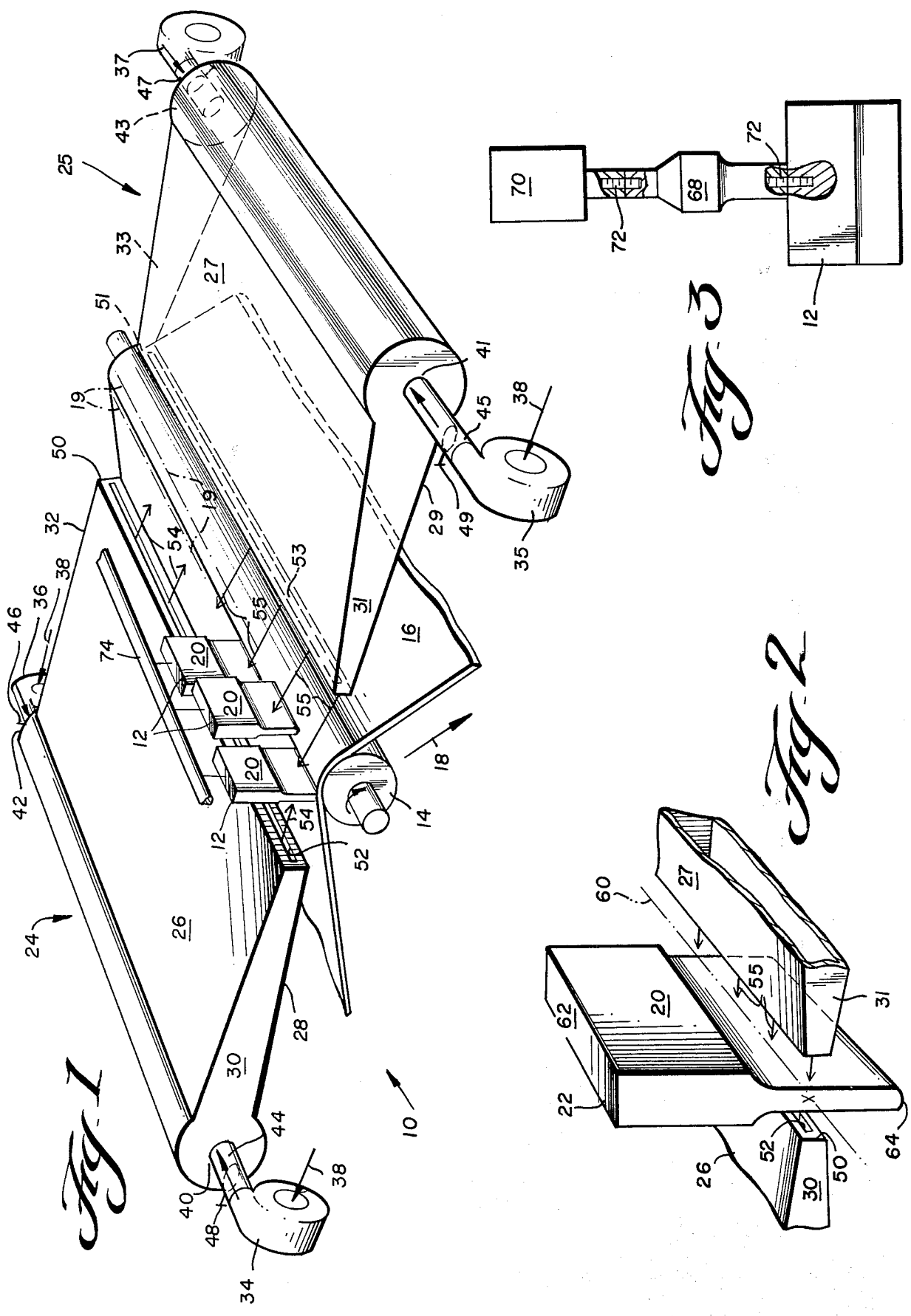

COOLING DEVICE FOR ULTRASONIC HORNS

BACKGROUND AND SUMMARY OF THE INVENTION

The present invention generally relates to an improved device for cooling ultrasonic horns of the type utilized to bond a web of textile material by ultrasonic bonding techniques. More particularly, the cooling device according to the present invention operates so as to cool the bonding horns at or above the nodal area thereof (e.g. the area of zero amplitude) so that heat naturally generated at the nodal area in addition to heat radiated from the fabric and conducted through the horn is counteracted to prevent deleterious effects of extreme temperature elevation.

Ultrasonic bonding techniques are particularly advantageous when processing non-woven webs of textile material and particularly heat joinable textile material such as synthetic fibers of a thermoplastic material. According to ultrasonic bonding technology, a bonding tool conventionally known in the art as a "bonding horn" is vibrated in the ultrasonic frequency range and is closely positioned with respect to the moving web of textile material. The bonding horn typically defines a surface (hereafter bonding surface) positioned in close proximity to, and in direct contact with the web to be bonded. Conventional means are provided so as to impart vibatory motion in the ultrasonic frequency range to the horn and thus ultrasonic frequency waves are transmitted to the surface of the textile web.

Those in the art will appreciate that proper positioning of the bonding horn is extremely important for the proper functioning thereof in accordance with ultrasonic bonding techniques. For example, the conventional bonding horn at its bonding surface will exhibit vibratory movement of maximum amplitude while the other end of the bonding horn exhibits another area of maximum amplitude. However, intermediate the two ends of the bonding horn there is an area of substantially zero amplitude conventionally referred to as the "node" or "nodal area". The areas of maximum amplitude on the other hand are commonly referred to as "antinodes" or "antinodal areas". This terminology will be used hereinafter as these are art-recognized terms for bonding horn behavior.

As the bonding horn vibrates, energy in the form of ultrasonic frequency waves is transmitted to the moving web of textile material. It is desirable that such frequency waves contact the web at maximum amplitude thereof so that vibrations can be imparted to the individual fibers in the textile web. Such vibrations, of course, produce movement of the individual fibers in the textile web and, in the area where these fibers contact one another, frictional forces generate heat to a sufficient degree so that at such points of contact, individual fibers will become somewhat melted. Upon cooling, these fibers are thus securely bonded to one another.

The temperature of the bonding horn exhibits a pronounced effect upon the ability of the horn to perform its intended function. For example, when the temperature of the bonding horn exceeds a certain predetermined value, thermal expansion thereof may adversely effect the bonding horn's natural resonant frequency thereby deleteriously affecting the quality of the bond imparted to the textile web. Moreover, since most horns are solid structures, heat generated at the bonding surface/textile web interface can be conducted up through the horn and thereby adversely affect the electronic converter normally associated with conventional bonding horns which converts electrical oscillations to mechanical oscillations. It is known that heat will naturally be generated in the nodal area of the bonding horns by virtue of the ultrasonic frequency operation thereof and that the heat thus generated can also deleteriously affect the proper operation of the bonding horn.

It is therefore important that bonding horns in any ultrasonic bonding apparatus be maintained at a proper predetermined temperature or, that the heat generated during the bonding operation be counteracted by suitable cooling means.

One prior art proposal for solving the problems inherent in utilizing ultrasonic bonding techniques is evidenced by reference to U.S. Pat. No. 3,405,024 to Attwood et al. Attwood et al disclose that a heater can be utilized so as to maintain the bonding horn at a proper predetermined temperature. In this regard, there is described in this prior art patent, a cyclical operation of the heater so that the temperature of the bonding horn can be maintained within a predetermined set range. Attwood et al utilize "spot" cooling wherein air is directed in an impinging relationship onto the surface of a conical bonding horn in the area between the horns bonding surface and the nodal point. Thus, when employing the system of Attwood et al, the heat generated at nodal area of the bonding horn remains unchecked.

While Attwood et al is certainly appropriate for use in a single bonding horn application, in today's modern textile mill wherein a substantially continuously moving web is desired to be ultrasonically bonded across the entire width thereof, such an apparatus suffers from some significant defects. For example, entire width ultrasonic bonding normally utilizes a plurality of bonding horns which are elongated in the width dimensions. Such horns are disposed in either a straight line or in a staggered relationship across the entire width of a substantially continuously moving textile web. Due to the elongation of the bonding horns, spot cooling as suggested by Attwood et al would have the deleterious effect of producing an irregular temperature distribution profile on the horn's surfaces. This, of course, is undesirable as any non-uniformity of horn temperature can lead to improper horn functioning. Moreover, by having the cooling air impinge upon the surface of the bonding horn between the node and the bonding surface thereof, the heat generated at the node is ignored when utilizing the system of Attwood et al thereby promoting temperature distortion in the horn.

It has been surprisingly discovered, however, that a narrow band of cooling fluid (e.g. air) preferably directed against both side surfaces of an elongated horn at or above the nodal area thereof can be effective in counteracting both types of heat generated during ultrasonic bonding techniques. For example, according to the present invention there is provided an apparatus which includes a manifold which is elongated in the transverse machine direction and closely disposed relative to each of the plurality of elongated bonding horns so as to permit the air flowing therethrough to impinge directly upon both side surfaces of the bonding horns at or above the node area thereof. In such a manner, heat radiated from the surface of the moving web due to ultrasonic bonding and conducted through the horn as well as heat naturally generated during vibratory movement of the horn at the node can be controlled and counteracted. Thus such heat will not deleteriously affect the electronic equipment which imparts vibratory movement to the bonding horn.

These and other advantages and aspects of the present invention will become more aparent after careful consideration is given to the detailed description of the preferred exemplary embodiment which follows.

BRIEF DESCRIPTION OF THE ACCOMPANYING DRAWING

Reference will be made herein to the accompanying drawing wherein:

FIG. 1 is a schematic perspective view of the cooling system according to the present invention;

FIG. 2 is a detailed schematic representation of the cooling system according to the present invention particularly showing a representative bonding horn thereof; and FIG. 3 is a schematic representation of a preferred mounting arrangement for a bonding horn of which the system according to the present invention is particularly suitable for cooling.

DETAILED DESCRIPTION OF THE PREFERRED EXEMPLARY EMBODIMENT

A preferred exemplary embodiment of a bonding system 10 according to the present invention is schematically depicted in FIG. 1. A plurality of elongated bonding horns 12 are dependently supported over an anvil roller 14 and extend substantially across the entire width of a textile web 16 as it moves therebeneath (arrow 18) by virtue of conventional means (not shown). The bonding horns 12 are preferably staggered relative to immediately adjacent ones so that some overlap can be provided to insure that adequate material bonding is effected. However, if desired the bonding horns 12 could be juxtaposed substantially in a straight line across the width of web 16. While only three representative bonding horns 12 are depicted in FIG. 1, the reader should appreciate that similar horns are intended to be disposed so as to extend across the width of web 16 (e.g. at dashed lines 19).

As seen in FIG. 1, the bonding horns are elongated transverse to the machine direction (arrow 18) and therefore include broad opposing side portions 20, 22 (shown more clearly in FIG. 2). In order to effect proper cooling of the horns 12, I have found it to be particularly advantageous to employ symmetrical air handling units 24, 25. Since air handling units 24, 25 are preferably identical yet opposite hand to one another, only unit 24 will be discussed in detail below for ease of reference. The reader should, of course, appreciate that such discussion is similarly applicable to unit 25. Thus, wherever possible, reference to structures comprising unit 25 will be parenthetically noted beside the reference to the corresponding structures comprising unit 24.

According to the present invention and as previously noted, the bonding horns 12 of an ultrasonic bonding system 10 are cooled by directing a narrow band of air against the broad sides 20, 22 at or above the node thereof. This unique feature of the present invention can be accomplished by providing an air handling unit 24 (25) on either side of horns 12. Unit 24 (25) is preferably constructed of upper and lower walls 26 (27), 28 (29), respectively and a pair of opposing side walls 30 (31) and 32 (33). Thus, a cavity is defined thereby permitting air to be accepted therein and directed onto the side surfaces of horns 12.

In order to provide cooling air, I utilize a dual arrangement of conventional blowers 34 (35), 36 (37) which direct ambient air (arrows 38) into the distal inlets 40 (41) and 42 (43) on unit 24 (25). In such a manner, a balanced air flow can be established. Blowers 34 (35) and 36 (37) are connected for fluid communication with unit 24 (25) via any conventional system of conduits 44 (45), 46 (47) which can be either flexible or rigid lengths of duct-like structures having any desired dimension. By choosing a sufficient length, conduits 44 (45) and 46 (47) will permit blowers 34 (35), 36 (37) to be remotely positioned relative unit 24 (25) so as to remove them from the heated ambient environment of the bonding system 12. This relative positioning will therefore ensure that fresh cooling air not subject to the heat associated with ultrasonic bonding operations will be delivered to horns 12 thereby enhancing the cooling effect thereof. A damper 48 (49) may be provided in conduits 44 (45) and 46 (47), respectively, so as to control the flow of air therethrough. Such dampers can either be manually or automatically controlled according to means well known in the fluid flow control art.

A representative bonding horn 12 is more clearly depicted in FIG. 2, wherein it is seen that the width dimension thereof is elongated in a dimension transverse to the machine direction. Intermediate to the upper surface 62 and bonding surface 64 is a node area (generally depicted by line 60) which exhibits substantially zero amplitude. Surface 62 and especially bonding surface 64 are at anti-nodes of the oscillatory movement (e.g. exhibit maximum amplitude during such movement).

Surface 62 is rigidly connected via a booster 68 to a converter 70 which converts electrical oscillations to mechanical oscillations so as to impart vibratory movement to the bonding horn 12 (see FIG. 3). The converter 70 and the booster 68 are each securely clamped by suitable mechanisms (not shown) to a surrounding rigid structure. Thus, horn 12 is dependently supported by converter 70 and booster 68 via coupling screws 72 yet is not itself otherwise supported. A schematic representation of such a support arrangement appears in FIG. 1 as reference numeral 74. A suitable system for imparting vibratory oscillations to horns 12 can be, for example, the system commercially provided by the Bransen Corporation utilizing converter Model No. 802 and power generator Model No. 186P.

I have found it particularly advantageous to construct units 24 (25) so that the upper and lower walls 26 (27), 28 (29), respectively, converge toward one another in the area of front wall 50 (51). The convergence of walls 26 (27), 28 (29) permit the flow of cooling air to become concentrated so that as it exits through opening 52 (53), a well defined narrow band thereof is established. Although, dimensions are not critical to the present invention, I have found it particularly beneficial to dimension opening 52 (53) at about ½ inch wide and having a length dimension substantially the same as the width of web 16. This ensures that all horns 12 are simultaneously contacted with cooling air. With cooling air being supplied via blowers 34 (35), 36 (37) at a rate of between about 200 feet per minute to about 250 feet per minute at a temperature of between about 70°–75° F., it is possible to maintain the temperature of horns 12 in the range of 80°–120° F., well below the temperature which deleteriously affects their proper operation. Other dimensions of units 24 (25) are, of course, possible, and are dictated by the particular process parameters involved, such as, air flow rate, horn temperature, air temperature, etc.

In practice, the bonding process actually approaches a quasi-continuous operation. That is, web 16 is conveyed beneath horns 12 at such a rate so as to ensure that it is retained in the area of ultrasonic frequency for sufficient period of time to effect bonding thereof. Thus, according to this type of practice, it is sufficient to cool only horns 12 for operation. During machine start-up, anvil roller 14 is initially preheated to a predetermined temperature until bonding equilibrium is established. Thereafter, oscillatory movement is imparted to the horns 12 and web 16 is conveyed therebeneath to effect bonding thereof. During machine stop, units 24 and 25 can be pivoted away from horns 12 by mounting them onto conduits 44, 46 and 45, 47 with suitable bearings or the like. This will, of course, permit cooling air to flow through units 24, 25 without impinging upon surfaces 20, 22 of horns 12.

While the present invention has herein described in what is presently conceived to be the most preferred and exemplary embodiments thereof, those in the art will appreciate that many modifications may be made thereof, which modifications shall be accorded the broadest scope of the appended claims so as to encompass all equivalent structures, systems and assemblies.

What is claimed is:

1. A cooling apparatus adapted to being operatively associated with an ultrasonic bonding system of the type including a plurality of bonding horns in juxtaposition with and disposed across the width of a moveable web of textile material, means for imparting ultrasonic vibratory movement to said bonding horns so as to effect bonding of said web at points where individual fibers thereof contact one another, and means for moving said web into bonding position with said bonding horns, said cooling apparatus comprising:

cooling means having an inlet and an outlet for directing a cooling fluid to impinge upon exterior side surfaces of said plurality of bonding horns, whereby said outlet is positioned in close relationship to each of said bonding horns so as to deliver a stream of cooling fluid at or above the nodal area thereof, said cooling fluid thereby counteracting the tendency of said bonding horns to experience deleterious temperature elevation due to heat naturally generated at the nodal area in addition to heat radiated through the horn at the bonding surface and conducted therethrough.

2. A cooling apparatus as in claim 1 wherein said cooling means further comprises blower means operatively connected to said inlet of said cooling means for supplying cooling fluid thereto.

3. A cooling apparatus as in claim 2 wherein said cooling means includes conduit means having predetermined length connecting said blower means to said inlet.

4. A cooling apparatus as in claim 1 or 3 wherein said cooling means includes upper and lower walls, a pair of opposing side walls and a front wall which together define a cavity through which said cooling fluid is transmitted.

5. A cooling apparatus as in claim 4 wherein said upper and lower walls are disposed so as to be converging in a direction toward said front wall.

6. A cooling apparatus as in claim 5 wherein said outlet is included in said front wall and comprises means defining a narrow opening so that air passing therethrough is delivered as a narrow band substantially conforming to said opening.

7. A cooling apparatus as in claim 6 wherein said narrow opening in about ½ inch wide and dimensioned in the lengthwise direction so as to simultaneously supply cooling fluid to each of said plurality of bonding horns.

8. A cooling apparatus as in claim 3 wherein said blower means includes two blowers opposingly disposed and connected to respective opposing inlet openings of said cooling means so as to deliver a balanced flow of cooling fluid thereto.

9. A cooling apparatus as in claim 3 or 8 wherein said conduit means includes damper means for controlling the flow of cooling fluid therethrough.

10. An apparatus for bonding a movable web of textile material by ultrasonic bonding techniques comprising in combination:

means for moving said web in a predetermined direction;

a plurality of ultrasonic bonding horns disposed transverse to said predetermined direction substantially across the entire width of said web;

means for imparting vibratory movement to said housing horns toward and away from said moving web, said vibratory movement being in the ultrasonic frequency range thereby generating sufficient heat energy to bond said web at points where individual fibers thereof contact one another, said heat tending to be conducted to said horn and thereby elevate the temperature thereof;

at least one cooling means for cooling a predetermined exterior side surface of said horn thereby counteracting said tendency thereof to experience an elevation of temperature, said cooling means directing a stream of cooling fluid so as to impinge upon a surface of said horn substantially at or above the nodal area thereof, said cooling fluid thereby counteracting the heat naturally generated at said nodal area due to vibratory movement thereof and also counteracting heat radiated to said horn and conducted therethrough by virtue of the ultrasonic bonding of said web.

11. An apparatus as in claim 10 wherein a pair of cooling means is provided, said pair for directing cooling fluid to each respective side surfaces of said bonding horns.

12. An apparatus as in claim 11 wherein each of said pair of cooling means comprises:

an inlet for permitting introduction of said cooling fluid therein;

an outlet defining a narrow opening for establishing discharge of a narrow band of said cooling fluid upon said horn surfaces; and blower means connected to said inlet means for supplying said cooling fluid thereto.

13. An apparatus as in claim 12 wherein said inlet includes a pair of opposing apertures defined in the side walls of said cooling means.

14. An apparatus as in claim 13 wherein said blower means includes a pair of blowers operatively connected to a respective one of said apertures.

15. An apparatus as in claim 14 wherein said narrow opening is about ½ inch wide and dimensioned in the lengthwise direction so as to supply cooling fluid to each of said plurality of bonding horns.

* * * * *